(12) United States Patent
Kida et al.

(10) Patent No.: US 7,761,008 B2
(45) Date of Patent: Jul. 20, 2010

(54) OPTICAL TRANSMISSION METHOD AND DEVICE

(75) Inventors: Toshimi Kida, Fukuoka (JP); Kazuhiro Uchida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 11/889,039

(22) Filed: Aug. 8, 2007

(65) Prior Publication Data

US 2008/0285969 A1 Nov. 20, 2008

(30) Foreign Application Priority Data

Aug. 10, 2006 (JP) .............................. 2006-217993

(51) Int. Cl.
*H04B 10/00* (2006.01)
(52) U.S. Cl. .............................. 398/70; 398/66; 398/72
(58) Field of Classification Search .............. 398/66–72
See application file for complete search history.

(56) References Cited

U.S. PATENT DOCUMENTS

| 2004/0156635 A1 | 8/2004 | Felske et al. |
| 2006/0093356 A1 | 5/2006 | Vereen et al. |

FOREIGN PATENT DOCUMENTS

| GB | 2 323 490 | 9/1998 |
| GB | 2 330 280 | 4/1999 |
| JP | 9-224037 | 8/1997 |
| JP | 10-93483 | 4/1998 |
| JP | 2937106 | 6/1999 |
| WO | WO 02/097476 | 12/2002 |
| WO | WO 03/049350 | 6/2003 |

OTHER PUBLICATIONS

Extended European Search Report, mailed Nov. 12, 2007 and issued in European Patent Application No. 07014996.8-2415.

*Primary Examiner*—Agustin Bello
(74) *Attorney, Agent, or Firm*—Staas & Halsey LLP (57) ABSTRACT

In an optical transmission method and device of a point-multipoint type, whether or not identification information of an optical network unit designated is received within a fixed phase tolerance for a transmission enabling phase designated to optical network units on multipoint sides is determined. When it is determined that no identification information of the optical network unit designated is received and identification information of any optical network unit is received up to a transmission enabling phase subsequently designated, a transmission stop command is transmitted to the optical network unit whose identification information is received. Also, when abnormality is detected in transmitted data from the optical network unit designated or any optical network unit within a transmission enabling duration designated for the transmission enabling phase designated to the optical network units, a transmission enabling duration reducing command is transmitted to the optical network unit or all of the optical network units respectively. Thereafter, when the identification information of the optical network unit designated is received within a fixed phase tolerance for the transmission enabling phase designated to the optical network units and identification information of another optical network unit is also received up to a transmission enabling phase subsequently designated, a transmission stop command to the other optical network unit and a command for restoring the transmission enabling duration for the optical network unit and all of the optical network units are transmitted.

4 Claims, 11 Drawing Sheets

PRIOR ART

OPTICAL TRANSMISSION METHOD AND DEVICE

BACKGROUND OF THE INVENTION

1. Field of the Invention

The present invention relates to an optical transmission method and device, and in particular to an optical transmission method and device on a point side in a PON (Passive Optical Network) transmission system of a point-multipoint type.

2. Description of the Related Art

Recently, demands for the construction of an optical access network represented by FTTH (Fiber to the Home) have been accelerated in order to realize advanced information communication services, in which a PON transmission system has been regarded as a means for realizing a high-capacity data communication and making the network construction inexpensive.

Figure 10:
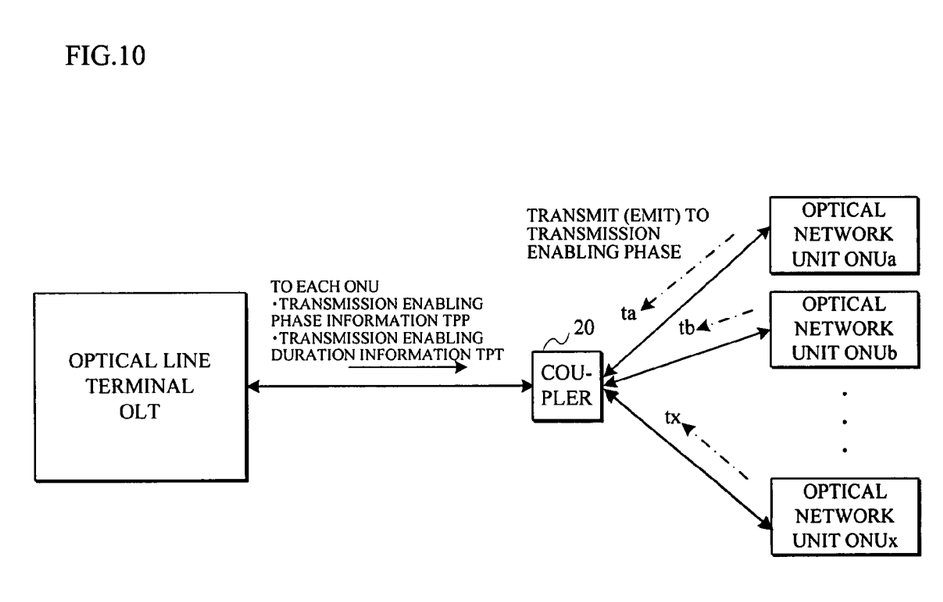
FIG. 10 is a block diagram showing an arrangement of a general PON transmission system.

FIG. 10 shows an arrangement of such a PON transmission system. In this system, an optical line terminal OLT on a point (station) side is mutually connected to optical network units ONUa, ONUb, . . . , ONUx (hereinafter, occasionally represented by a reference character ONU) on multipoint sides bundled by a coupler 20, based on a clock synchronization. The technology of controlling a plurality of optical network units ONUs by a single optical line terminal OLT is prescribed in ITU-T recommendations G.983 and G.984.

The optical line terminal OLT transmits, an initial setting information, transmission enabling phase information TPP and transmission enabling (allowable) duration information TPT to each optical network unit ONU through the coupler 20. In each optical network unit having received the transmission enabling phase information TPP and the transmission enabling duration information TPT, e.g. the optical network unit ONUa transmits (emits) light at a designated transmission enabling phase ta, the optical network unit ONUb similarly transmits light at a designated transmission enabling phase tb, and the optical network unit ONUx performs the light transmission at a designated transmission enabling phase tx.

Figure 11:
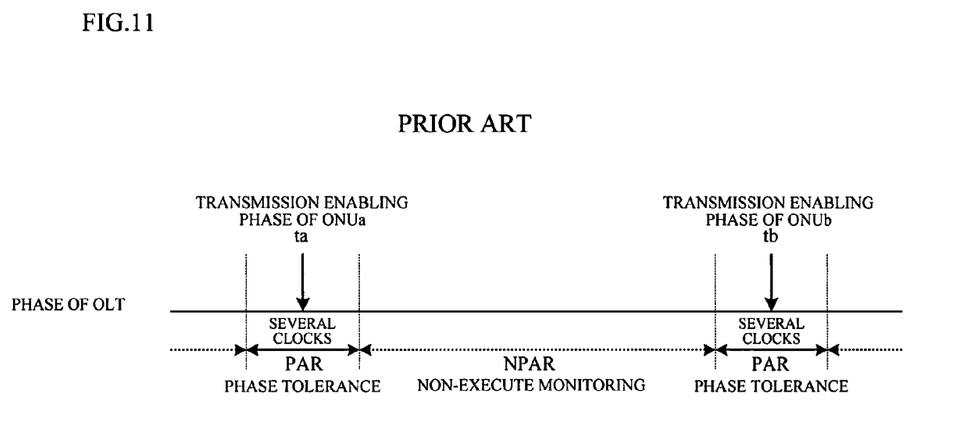
FIG. 11 is a diagram showing a phase monitoring system of a prior art optical line terminal (OLT).

The optical line terminal OLT monitors, as shown in FIG. 11, an optical signal transmitted from each optical network unit ONU around the transmission enabling phase designated per transmission line clock. For example, in the absence of a light transmission (emission) of the optical network unit ONUa in a phase tolerance PAR where phases for several clocks around the transmission enabling phase ta which the optical line terminal OLT has designated to the optical network unit ONUa are supposed to form the phase tolerance PAR as shown in FIG. 11, it is determined that no light is emitted (no-burst). The determination of the light transmission from the optical network unit ONU has not been performed in the outside of the phase tolerance PAR (NPAR), so that an optical network unit ONU abnormally emitting light has not been specified.

On the other hand, there are a method and system for notifying abnormal state of subscriber line transmission line which have a line terminal having a network monitoring device which manages a network state, notifies a state to a user upon detection of abnormality, and responds to an inquiry from the user, and a communication abnormality processor, in which an abnormal network unit number is notified to all of the network units upon detection of communication abnormality, and a network unit having an OAM processor, an ATM multiplexer/demultiplexer, a PON terminal portion, and an SEL, in which based on the abnormal network unit number from the line terminal, the state notification from the network monitoring device is connected to the user, a failure inquiry from the user is connected to the network monitoring device, a predetermined backup path is set up for the network unit which has a failure, and the network unit is connected to the user through the path and is connected to the network monitoring device inquired from the user (see e.g. patent document 1).

Also, there is a failure detection method in an optical transmission system in which a line terminal and an optical network unit are connected with a star coupler and an optical fiber transmission line, a passive double star communication or the like is performed by an optical signal, a compulsory emission instructing cell is branched by the optical fiber transmission line and the star coupler to be transmitted to the optical network unit from the line terminal individually, the optical network unit having received the compulsory emission instructing cell compulsorily emits light, and the line terminal receives the compulsorily emitted light, and based on the reception or non-reception in this case, a point where an individual failure of the optical fiber transmission line, star coupler, or the optical network unit has occurred is separately detected (see e.g. patent document 2).

[Patent document 1] Japanese Patent Application Laid-open No. 9-224037

[Patent document 2] Japanese Patent Application Laid-open No. 10-93483

While in the above-mentioned PON transmission system, the optical network unit transmits the optical signal based on the transmission enabling phase information from the optical line terminal, there has been a problem that since the optical signals from a plurality of optical network units are multiplexed by the coupler, in the presence of an abnormal optical network unit which transmits the optical signal at a phase other than that permitted by the optical line terminal, the optical signal collides with the light emission of other normal optical network unit, thereby preventing the communications.

SUMMARY OF THE INVENTION

It is accordingly an object of the present invention to provide an optical transmission method and device of a point-multipoint type which specify an optical network unit with abnormal transmission phase and stop the light emission thereof, so that an optical collision with other normal optical network units can be prevented.

[1] In order to achieve the above-mentioned object, an optical transmission method (or device) of a point-multipoint type according to the present invention comprises: a first step of (or means) determining whether or not identification information of an optical network unit designated is received within a fixed phase tolerance for a transmission enabling phase designated to optical network units on multipoint sides; and a second step of (or means) transmitting, when it is determined at the first step (or means) that no identification information of the optical network unit designated is received and when identification information of any optical network unit is received up to a transmission enabling phase subsequently designated, a transmission stop command to the optical network unit whose identification information is received.

Figure 1:
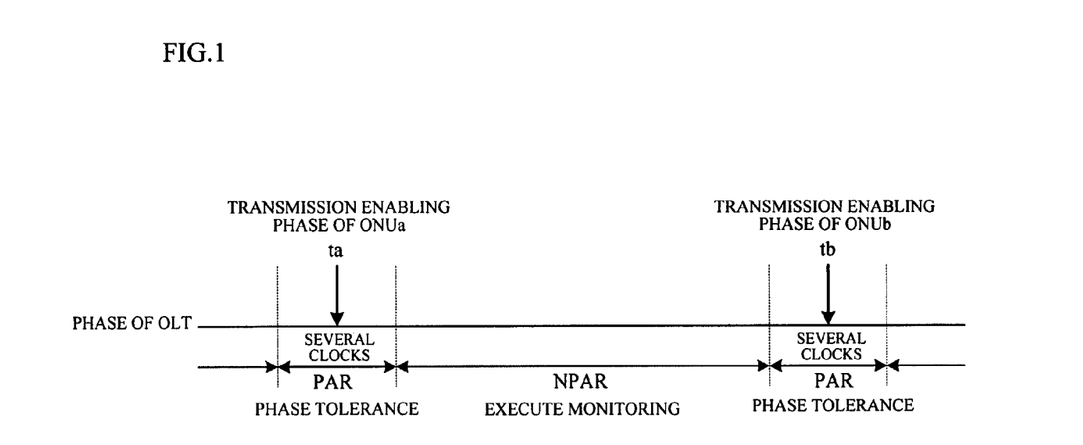
FIG. 1 is a diagram showing a principle of an optical transmission method and device according to the present invention.

Namely, when a transmission enabling phase is designated to each optical network unit so that an optical signal is responsively transmitted from each optical network unit, as shown in FIG. 1, it is determined at the first step (or means) whether or not identification information of e.g. optical network units ONUa and ONUb designated is received within a fixed phase tolerance PAR for several clocks around transmission enabling phases ta and tb designated to the optical network units ONUa and ONUb.

When it is determined at the first step (or means) that the identification information of the optical network units ONUa and ONUb designated could not be received, it is determined at the second step (or means) that when identification information of any optical network unit is received up to a transmission enabling phase subsequently designated, the optical network unit having received the identification information transmits an optical signal at an erroneous transmission enabling phase, so that a transmission stop command is transmitted to the optical network unit.

Thus, it is made possible for the optical network unit whose transmission enabling phase is abnormal to avoid an optical collision with other optical network units since the transmission thereafter is stopped.

[2] Also, in order to achieve the above-mentioned object, an optical transmission method (or device) according to the present invention comprises: a first step of (or means) detecting abnormality in transmitted data from optical network units within a transmission enabling duration designated for a transmission enabling phase designated to the optical network units on multipoint sides; a second step of (or means) transmitting, when at the first step (or means) abnormality is detected in transmitted data from any optical network unit, a transmission enabling duration reducing command to all of the optical network units; and a third step of (or means) transmitting, when identification information of an optical network unit designated is received within a fixed phase tolerance for a transmission enabling phase designated to optical network units and when identification information of another optical network unit is also received up to a transmission enabling phase subsequently designated after the transmission of the transmission enabling duration reducing command at the second step (or means), a transmission stop command to the other optical network unit and a command for restoring the transmission enabling duration for all of the optical network units.

Namely, in this case, whether or not abnormality has occurred in transmitted data from each optical network unit (designated or non-designated) within a transmission enabling duration designated with respect to the designated transmission enabling phase is checked at the first step (or means).

As a result, when an abnormality has been detected in the transmitted data from any optical network unit, a transmission enabling duration reducing command is transmitted to all of the optical network units at the second step (or means) to suppress the transmission of the optical signal.

Thus, when the identification information of the optical network unit designated is received and also the identification information of another optical network unit is received up to the subsequent transmission enabling phase within a fixed phase tolerance for the transmission enabling phase designated as a result of the command of the transmission enabling duration at all of the optical network units, a transmission stop command is transmitted to the other optical network unit at the third step (or means) and since the transmission enabling duration has been reduced at the above-mentioned second step (or means), a command to restore the transmission enabling duration is transmitted to all of the optical network units.

Thus, when the optical signal from the non-designated optical network unit is transmitted between the adjoining two transmission enabling phases, the optical signal is detected and the transmission of the optical network unit where the phase abnormality has occurred is stopped, so that the optical collision is prevented.

[3] Also, in order to achieve the above-mentioned object, an optical transmission method (or device) according to the present invention comprises: a first step of (or means) determining whether or not identification information of an optical network unit designated is received within a fixed phase tolerance for a transmission enabling phase designated to optical network units on multipoint sides; a second step of (or means) transmitting, when abnormality is detected in transmitted data from the optical network unit designated up to a transmission enabling phase subsequently designated after it is determined at the first step (or means) that the identification information of the optical network unit designated is received, a transmission enabling duration reducing command to the optical network unit designated; and a third step of (or means) transmitting, when the identification information of the optical network unit designated is received and when identification information of another optical network unit is also received up to a transmission enabling phase subsequently designated after the transmission of the transmission enabling duration reducing command at the second step (or means), a transmission stop command to the other optical network unit and a command for restoring the transmission enabling duration for the optical network unit designated.

While in the above-mentioned [2], the command to reduce the transmission enabling duration is transmitted to all of the optical network units when abnormality has been detected in the transmitted data from any optical network unit, in this case [3] a command to reduce the transmission enabling duration is transmitted only to the normal optical network unit designated since it is recognized that the identification information of the optical network unit designated before the abnormality of the transmitted data has been normally received.

Thus, when the identification information of the optical network unit designated is received and the identification information of another optical network unit is received up to the subsequent transmission enabling phase as a result of the reduced transmission enabling duration, the transmission stop command is transmitted to the other optical network unit and the command to restore the transmission enabling duration is transmitted to the optical network unit to which the reduction of the transmission enabling duration is commanded at the third step (or means).

Thus, by detecting the transmission of the optical signal of the non-designated optical network unit between the adjoining transmission enabling phases and by stopping the transmission, an optical collision can be avoided.

As mentioned above, according to the present invention, an optical network unit in which a light is abnormally transmitted (emitted) is identified and the emitting operation is stopped, thereby enabling an optical collision to be eliminated and communications of a normal optical network unit to be quickly restored.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Hereinafter, embodiments [1]-[3] of the optical transmission method and device according to the present invention will be described referring to the attached figures. The embodiments can be typified as the following table 1.

The embodiments [1]-[3] of the present invention will now described in line with types A-E of the table 1.

Embodiment 1

Figure 2:
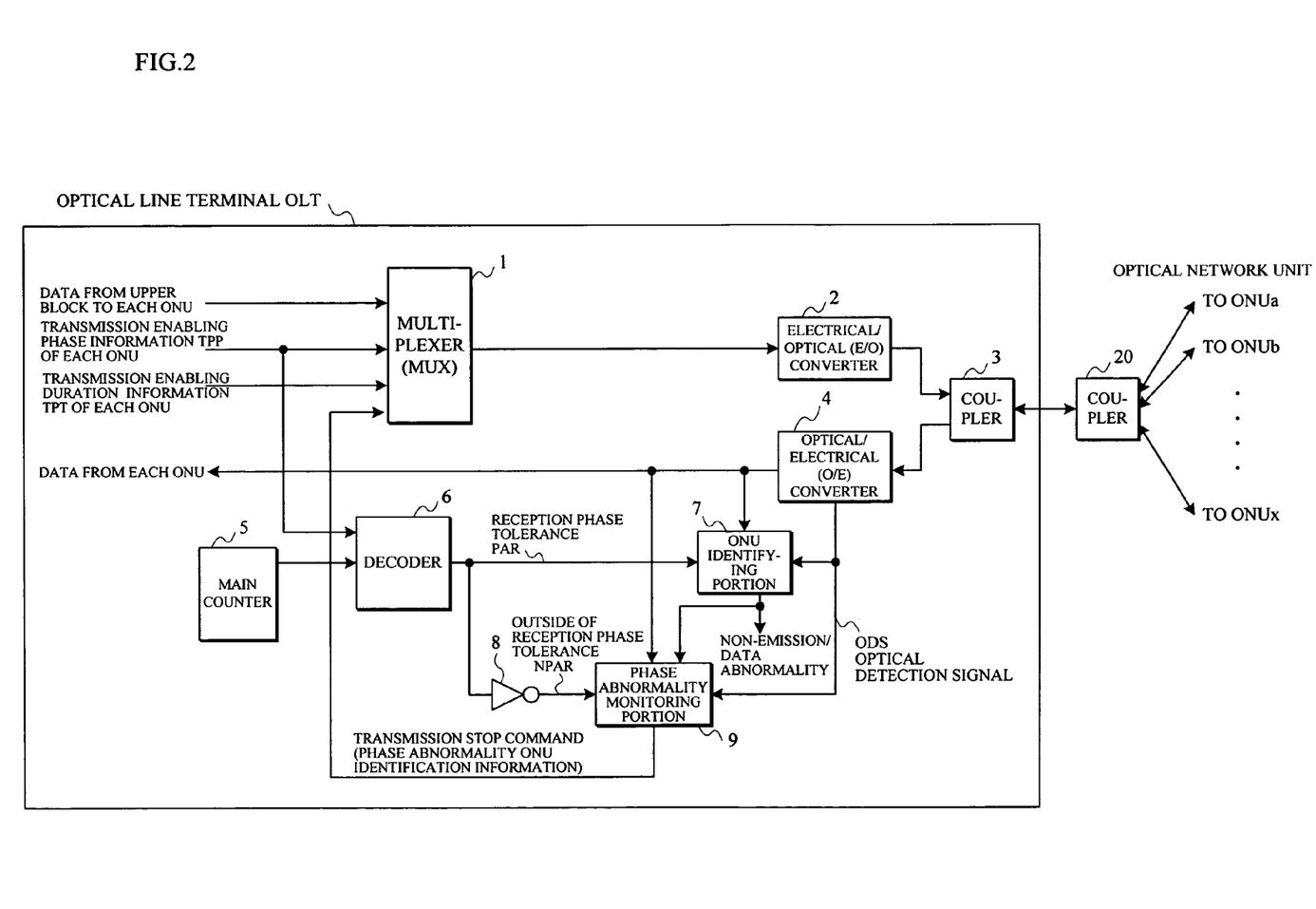
FIG. 2 is a block diagram showing an embodiment [1] of an optical transmission method and device according to the present invention.

FIG. 2

In this embodiment, the transmission system of an optical line terminal OLT is composed of a multiplexer (MUX) 1 which multiplexes data from an upper block to each optical network unit ONU, transmission enabling phase information TTP to each optical network unit, transmission enabling duration information TPT to the optical network unit, and a transmission stop command which will be described later, an electrical/optical (E/O) converter 2 which converts an electrical signal from the multiplexer 1 into an optical signal, and a coupler 3 which transmits the optical signal from the electrical/optical converter 2 to the optical network unit ONU through a coupler 20.

Also, the reception system of the optical line terminal OLT is composed of an optical/electrical (O/E) converter 4 which converts the optical signal received from the coupler 3 into an electric signal, a main counter 5 which generates a clock synchronized with the optical network unit ONU, a decoder 6 which generates a reception phase tolerance (PAR) signal by the transmission enabling phase information TTP to the optical network unit ONU and a counter value of the main counter 5, an ONU identifying portion 7 which receives an optical detection signal ODS detected by the optical/electrical con-

TABLE 1

ONU TRANSMISSION STATE & MONITORING/CONTROLLING IN OLT

| TYPE | DESIGNATED PHASE | OUTSIDE OF DESIGNATED PHASE | STATE | TRANSMISSION CONTROL | APPLIED EMBODIMENT |
|------|------------------|------------------------------|-------|----------------------|--------------------|
| A | EMISSION | NON-EMISSION | NORMAL | NO CONTROL IS REQUIRED | [1]~[3] |
| B | NON-EMISSION | NON-EMISSION | ABNORMAL | NO CONTROL IS REQUIRED | [1]~[3] |
| C | NON-EMISSION | EMISSION | OPTICAL COLLISION IS ABSENT | ABNORMAL | ABNORMAL ONU'S TRANSMISSION IS STOPPED | [1] |
| D | EMISSION | EMISSION | OPTICAL COLLISION IS PRESENT | ABNORMAL | ALL ONUs TRANSMISSION ENABLING DURATION IS REDUCED ABNORMAL ONU'S TRANSMISSION IS STOPPED | [2] |
| E | EMISSION | EMISSION | OPTICAL COLLISION IS PRESENT | ABNORMAL | ABNORMAL ONU'S TRANSMISSION ENABLING DURATION IS REDUCED ABNORMAL ONU'S TRANSMISSION IS STOPPED | [3] |

Namely, whether or not emission from an optical network unit exists at a designated phase, and whether or not an optical collision exists in the outside of the phase designated are detected. Also, an optical network unit whose phase is abnormal is identified. In response thereto, a transmission stop/transmission enabling duration control are performed.

verter 4, data (ONU data) from the optical network unit ONU, and the reception phase tolerance (PAR) signal from the decoder 6, and outputs a non-emission state signal (or data abnormal signal), an inverter 8 which generates a reception phase outside-tolerance (NPAR) signal between the reception phase tolerance PAR outputted from the decoder 6 and a subsequent transmission enabling phase, and a phase abnormality monitoring portion 9 which receives the ONU data and the optical detection signal ODS from the optical/electrical converter 4, a non-emission state signal from the ONU identifying portion 7, and the reception phase outside-tolerance (NPAR) signal from the inverter 8, and transmits the transmission stop command together with the phase abnormality ONU identification information to the multiplexer 1.

As for the types shown in the above-mentioned table 1, the embodiment [1] includes types A-C, which will now be described respectively.

Figure 3:
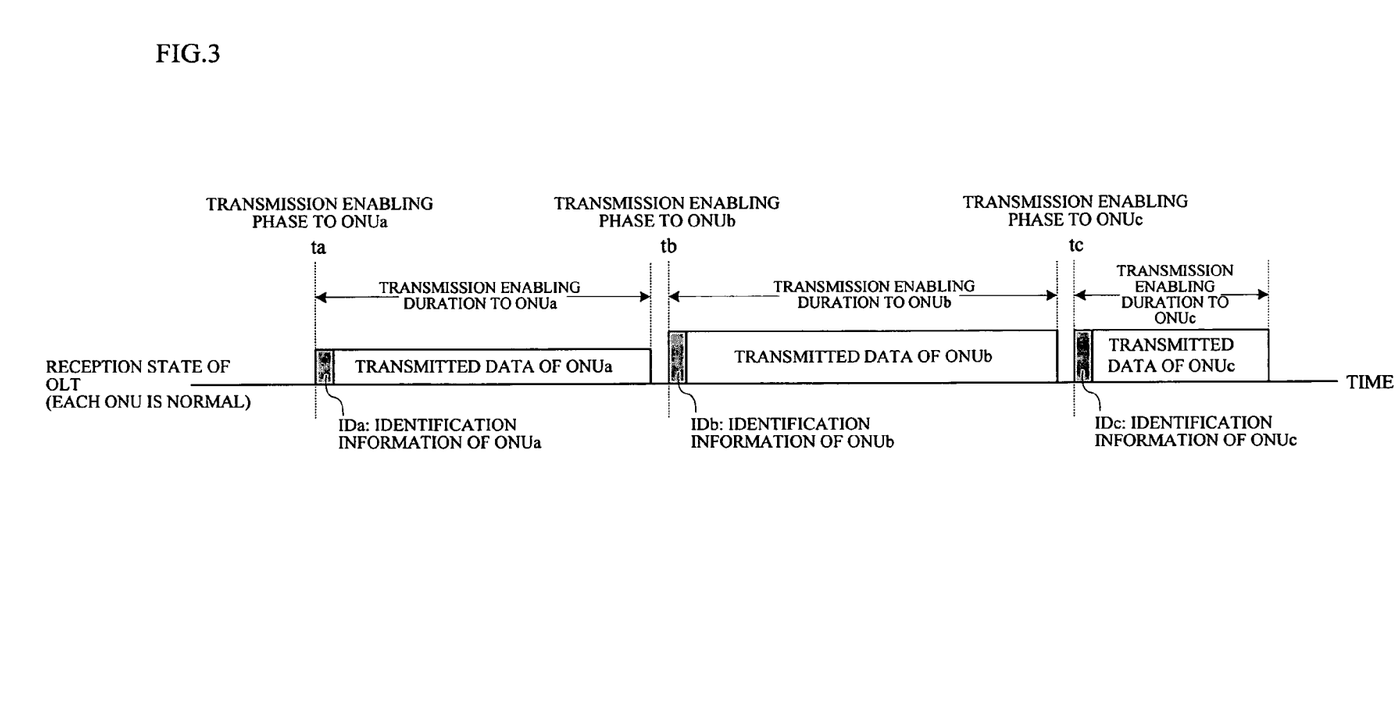
FIG. 3 is a time chart showing a normal operation example (type A) of an embodiment [1] of the present invention.

Normal Operation Example (Type A): FIG. 3

This is a type, as shown in FIG. 3, in which all of the optical network units ONUs normally transmit identification information and data thereof. Namely, as for an optical network unit ONUb, for example, the identification information IDb thereof is detected from the designated transmission enabling phase tb within the reception phase tolerance PAR shown in FIG. 1. Thereafter, the transmitted data of the optical network unit ONUb continues for the transmission enabling duration TPT designated. Since neither abnormal data is generated in the ONU identifying portion 7, nor abnormal ONU identification information is outputted in the phase abnormality monitoring portion 9 outside the reception phase tolerance NPAR, so that this type is out of control of the present invention.

Figure 4:
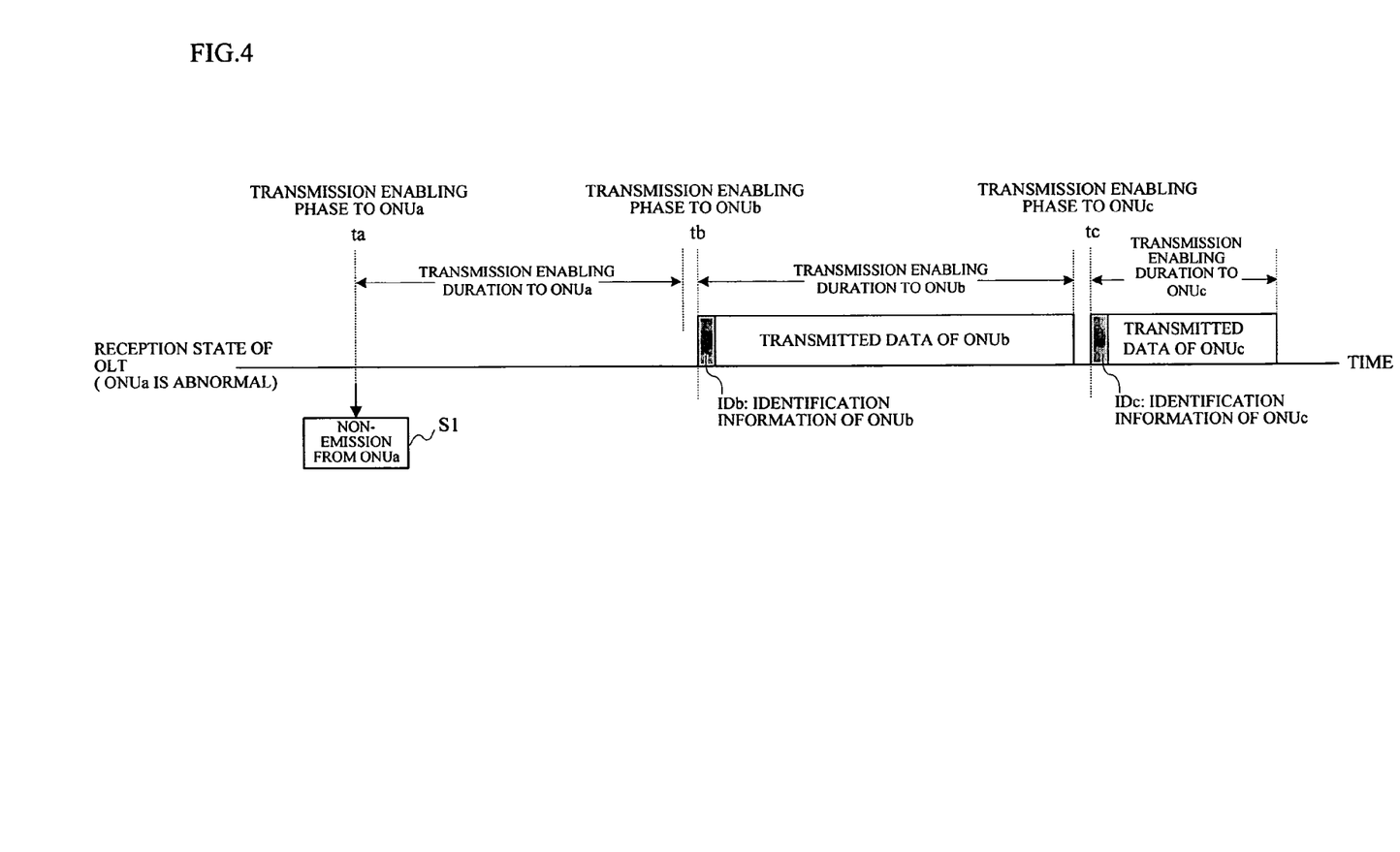
FIG. 4 is a time chart showing an abnormal operation example [1] (type B) of an embodiment [1] of the present invention.

Abnormal Operation Example [1] (Type B): FIG. 4

This type B shows a case where an abnormal state occurs only in an optical network unit ONUa within the optical network units ONUa-ONUc.

Namely, neither the optical detection signal ODS nor the ONU data is generated from the optical/electrical converter 4 in a transmission enabling phase ta, so that the ONU identifying portion 7 only outputs a signal (no burst signal) indicating non-emission from the optical network unit ONUa (at step S1). This is an alarm similar to one conventionally used, and no communication jamming to the normal optical network unit ONU occurs, so that this type is made out of control.

Figure 5A:
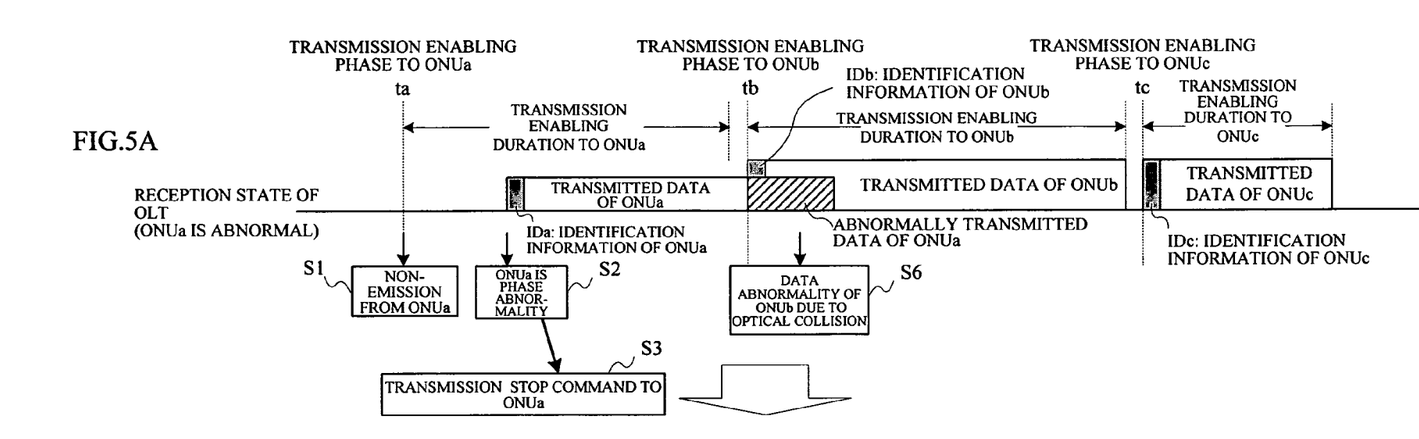
FIGS. 5A and 5B are time charts showing an abnormal operation example [2] (type C) of an embodiment [1] of the present invention.
Figure 5B:
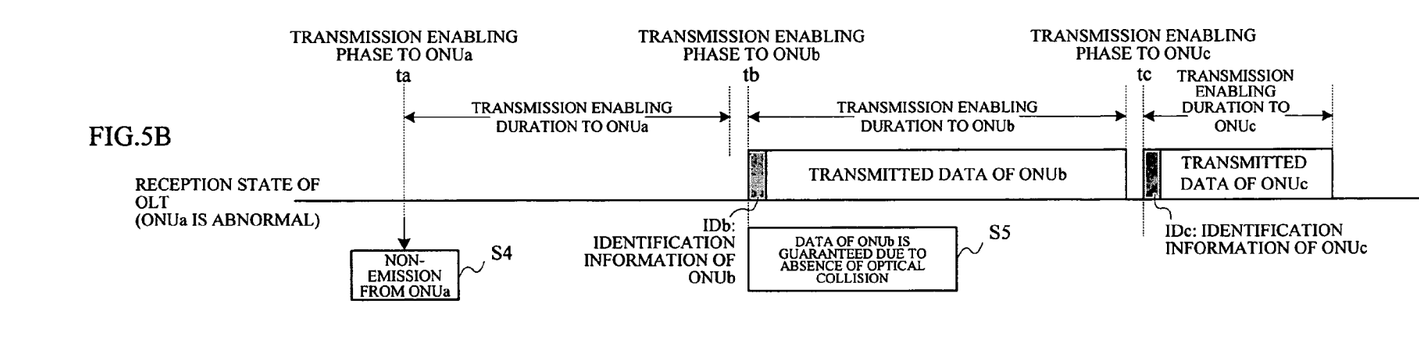

Abnormal Operation Example [2] (Type C): FIGS. 5A and 5B

This type C handles a case where the phase of the optical network unit ONUa is abnormal, as shown in FIG. 5A.

Since the transmission phase of the optical network unit ONUa is abnormal, no emission exists within the reception phase tolerance PAR of the designated transmission enabling phase ta (at step S1) in the same way as the above-mentioned type B. At this time, the phase abnormality monitoring portion 9 receiving the non-emission state signal from the ONU identifying portion 7 detects the identification information of the optical network unit ONUa whose phase is abnormal within the duration (governed by the inverter 8) between the transmission enabling phase ta to the optical network unit ONUa and the transmission enabling phase tb to the optical network unit ONUb subsequently designated (at step S2).

Thus, the phase abnormality monitoring portion 9 transmits the transmission stop command with the ONU identification information to the optical network unit ONUa through the multiplexer 1, the electrical/optical converter 2, and the coupler.

When the phase abnormality monitoring portion 9 transmits the transmission stop command to the optical network unit ONUa (at step S3) as mentioned above, no data is transmitted from the optical network unit ONUa as shown in FIG. 5B (at step S4). Therefore, an optical collision to the subsequent optical network units ONUb and ONUc is eliminated by the transmitted data of the optical network unit ONUa with the phase abnormality, thereby enabling respective transmitted data to be guaranteed (at step S5).

Thus, since the transmission phase of the optical network unit ONUa is abnormal, the identification information IDb of the optical network unit ONUb is not detected in the phase tolerance PAR of the transmission enabling phase tb of the optical network unit ONUb subsequently designated, so that the ONU identifying portion 7 outputs data abnormality (at step S6) of the optical network unit ONUb due to the optical collision. This data abnormality may be made an additional condition of the transmission stop command of the above-mentioned step S3.

Embodiment 2

Figure 6:
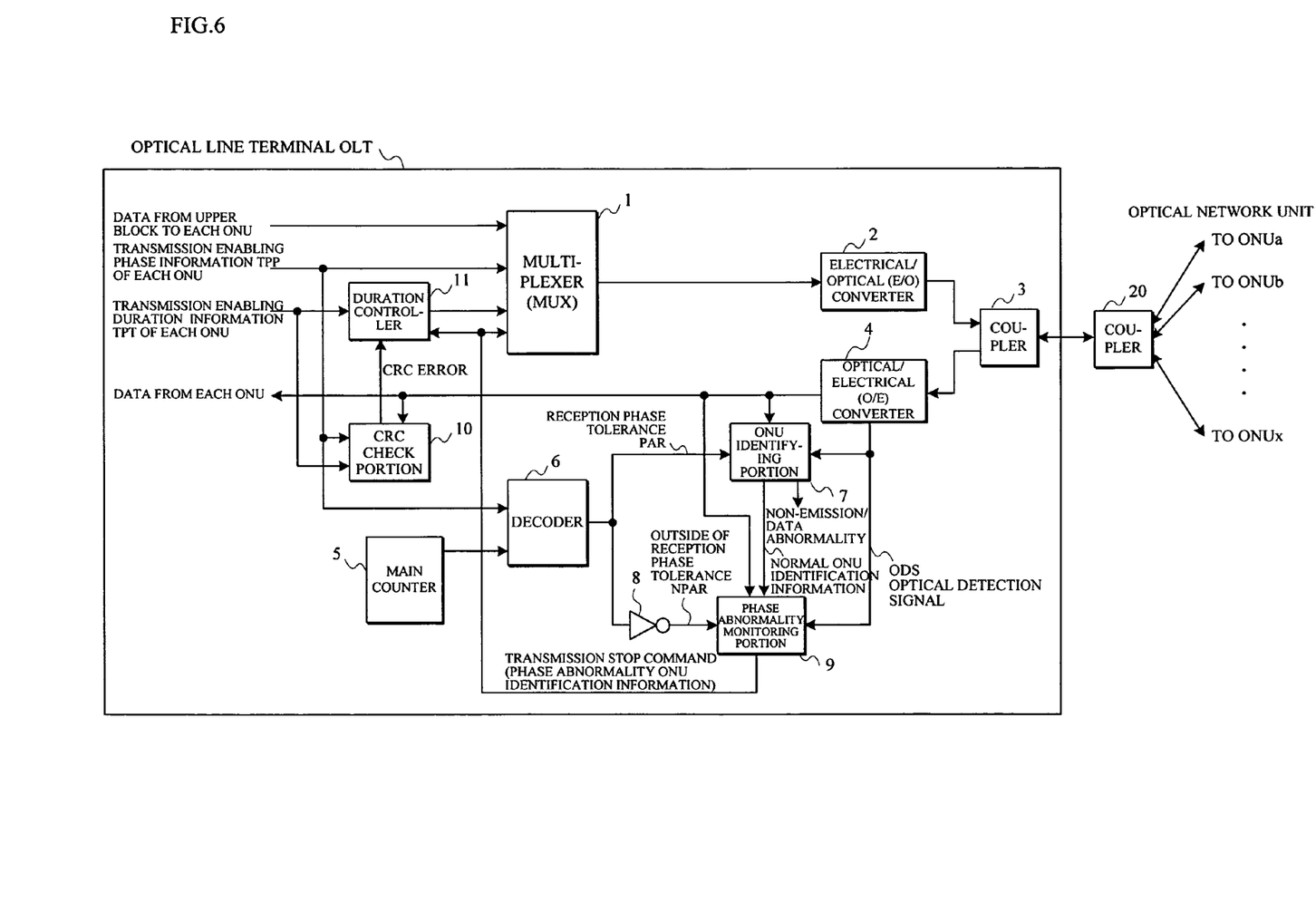
FIG. 6 is a block diagram showing an embodiment [2] of an optical transmission method and device according to the present invention.

FIG. 6

This embodiment [2] is different from the above-mentioned embodiment [1] in that a CRC check portion 10 and a duration controller 11 are provided.

Namely, the CRC check portion 10 receives the transmission enabling phase information TTP and the transmission enabling duration information TPT to each optical network unit ONU, determines whether or not the ONU data outputted from the optical/electrical converter 4 is normal with respect to the designated transmission enabling duration, and generates a CRC error when the data is abnormal. Upon receiving the CRC error, the duration controller 11 transmits the transmission enabling duration information TPT of the optical network unit ONU controlled to the multiplexer 1. The duration controller 11 is also connected to the phase abnormality monitoring portion 9.

Figure 7A:
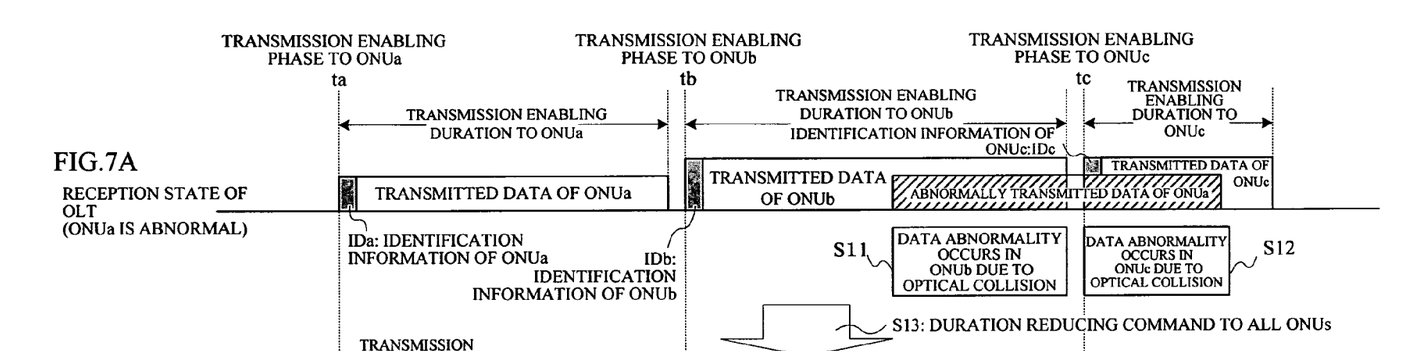
FIGS. 7A-7C are time charts showing an abnormal operation example (type D) of an embodiment [2] of the present invention.
Figure 7B:
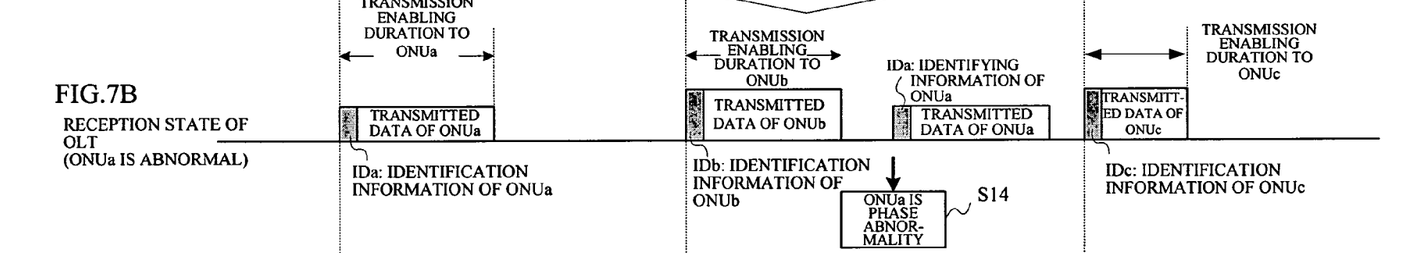
Figure 7C:
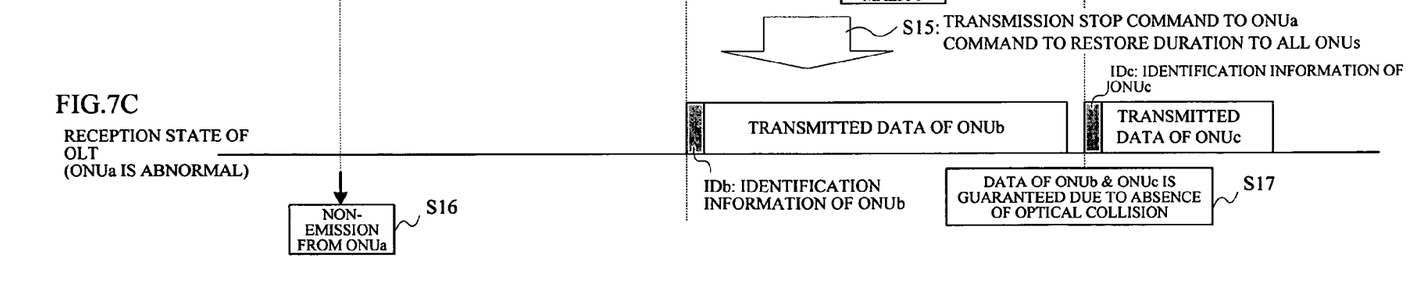

Abnormal Operation Example (Type D): FIGS. 7A-7C

This type D shows an example, as shown in FIG. 7A, where while both the optical network units ONUb and ONUc perform a normal optical transmission, the optical network unit ONUa incorrectly transmits abnormal data to the other optical network units ONUb and ONUc (at steps S11 and S12).

Accordingly, in this case, the ONU identifying portion 7 provides normal ONU identification information to the phase abnormality monitoring portion 9 at both of the transmission enabling phases ta and tb.

On the other hand, the CRC check portion 10 checks whether the data is normal/abnormal within the transmission enabling duration between transmission enabling phases by the transmission enabling phase information TTP and the transmission enabling duration information TPT. Therefore, as shown at step S11 in FIG. 7A, when the optical network unit ONUa transmits the abnormal data and the abnormality occurs in the transmitted data of the normal optical network unit ONUb, this abnormality occurrence is transmitted to the duration controller 11 as the CRC error.

Thus, the duration controller 11 having received as the CRC error the occurrence of data abnormality in the optical network unit ONUb due to the optical collision provides a command to reduce the transmission enabling duration TPT to all of the optical network units ONUs (at step S13). This is executed through the multiplexer 1, the electrical/optical converter 2, and the coupler 3.

Thus, the transmission enabling duration from the optical network unit ONU is reduced, so that the time chart shown in FIG. 7B is obtained.

As a result, the transmission enabling duration to the optical network unit ONUb is reduced between the transmission enabling phases tb and tc. Therefore, the identification information IDa of the optical network unit ONUa concerning the abnormal phase which has not been observed in FIG. 7A can be observed, which is detected by the phase abnormality monitoring portion 9 (at step S14). The phase abnormality monitoring portion 9 transmits the transmission stop command to the optical network unit ONUa and a command to restore the duration to all of the optical network units ONUa-ONUx (at step S15) through the duration controller 11.

As a result, the optical network unit ONUa whose phase is abnormal as shown in FIG. 7C becomes a non-emission state without generating any optical signal (at step S16), and optical collision is eliminated in the subsequent optical network units ONUb and ONUc, thereby enabling respective data to be guaranteed (at step S17).

It is to be noted that while the data abnormality at step S12 is not processed in this type, this data abnormality occasion may be added as an additional condition.

Embodiment (3)

Figure 8:
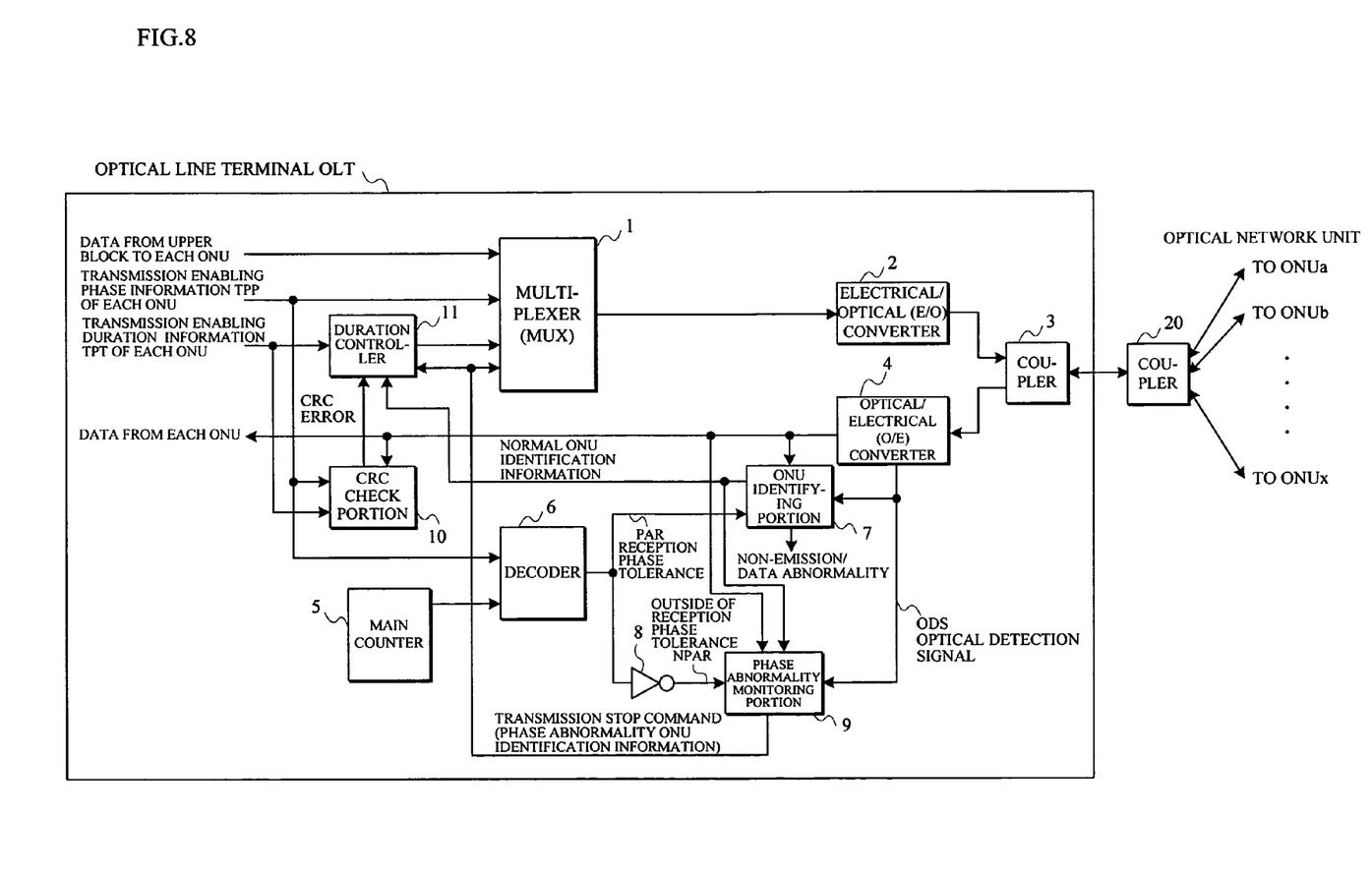
FIG. 8 is a block diagram showing an embodiment [3] of an optical transmission method and device according to the present invention.

FIG. 8

This embodiment is different from the embodiment [2] shown in FIG. 6 in that the normal ONU identification information generated from the ONU identifying portion 7 is also provided to the duration controller 10, which will be described as type E.

Figure 9A:
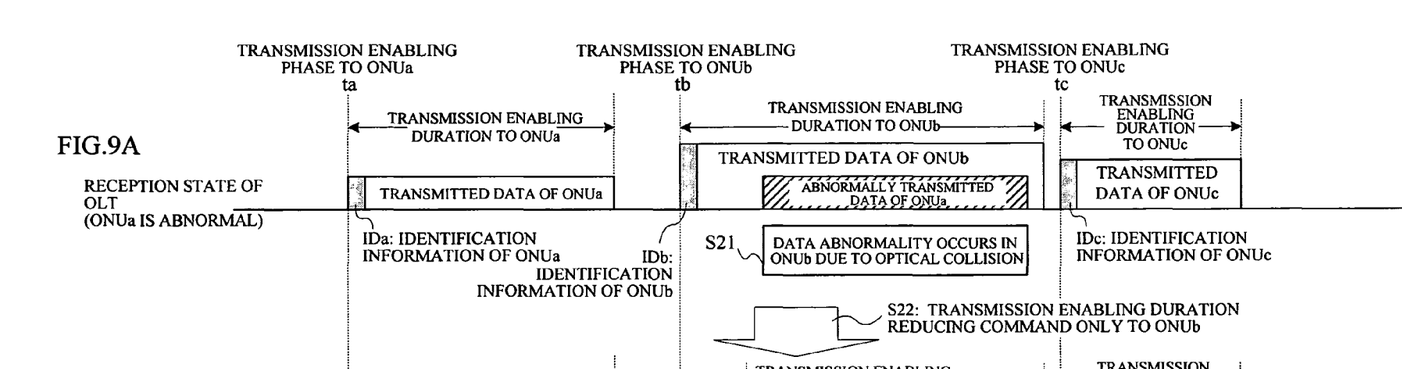
FIGS. 9A-9C are time charts showing an abnormal operation example (type E) of an embodiment [3] of the present invention.
Figure 9B:
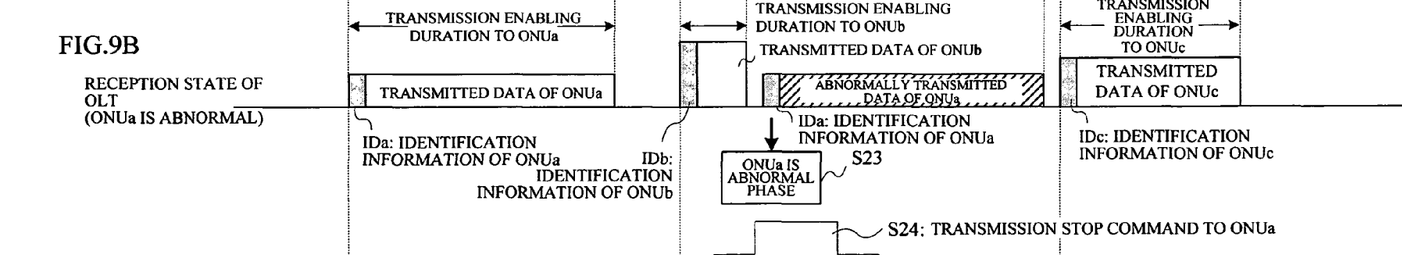
Figure 9C:
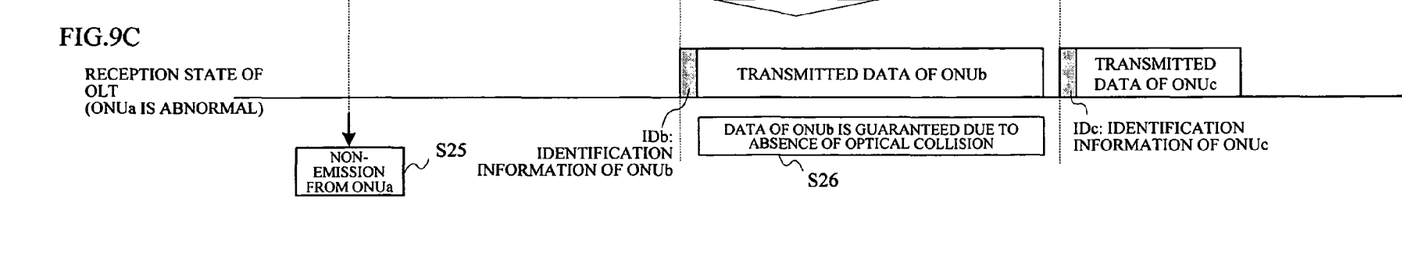

Abnormal Operation Example (Type E): FIGS. 9A-9C

FIG. 9A shows an abnormal state where the optical network unit ONUa whose phase is abnormal is in a phase abnormality state, and the optical signal of the optical network unit ONUa concerning the phase abnormality is generated between the transmission enabling phases tb and tc. While this case does not refer to the state where the abnormal data of the optical network unit ONUa further continues up to the subsequent optical network unit ONUc, different from the above-mentioned type D (see FIG. 7A), a case where an optical collision occurs for the optical network unit ONUc can be similarly handled as shown in the following operation.

Firstly, as shown in FIG. 9A, the occurrence of the data abnormality due to the optical collision between the transmitted data of the optical network unit ONUb and the transmitted data of the optical network unit ONUa is detected by the CRC check portion 10 (at step S21).

However, since the identification information IDb of the optical network unit ONUb is detected in the transmission tolerance PAR of the transmission enabling phase tb by the ONU identifying portion 7 in the embodiment [3], the ONU identification information IDb of the normal optical network unit ONUb is transmitted to the duration controller 11. Upon receiving the CRC error from the CRC check portion 10 and the normal ONU identification information IDb from the ONU identifying portion 7, the duration controller 11 transmits the command to reduce the transmission enabling duration TPT of only the normal optical network unit ONUb through the multiplexer 1, the electrical/optical converter 2, and the couplers 3 and 20 (at step S22).

As a result, as shown in FIG. 9B, only the transmission enabling duration TPT designated to the optical network unit ONUb is reduced. Therefore, as shown, such abnormal transmitted data of the subsequent optical network unit ONUa can be observed, and the phase abnormality monitoring portion 9 detects the phase abnormality of the optical network unit ONUa in the outside of the reception phase tolerance NPAR (at step S23), so that the transmission stop command is transmitted to the optical network unit ONUa (at step S24).

Thus, as shown in FIG. 9C, the optical network unit ONUa assumes a non-emission state in the transmission enabling phase ta of the optical network unit ONUa (at step S25), and an optical collision for the transmitted data of the optical network units ONUb and ONUc subsequently transmitted is eliminated, thereby enabling the data to be guaranteed (at step S26).

It is to be noted that the present invention is not limited by the above-mentioned embodiments, and it is obvious that various modifications may be made by one skilled in the art based on the recitation of the claims.

What is claimed is:

1. A point-multipoint optical transmission method comprising:
a first step of detecting abnormality in transmitted data from optical network units within a transmission enabling duration designated for a transmission enabling phase designated to the optical network units on multipoint sides;
a second step of transmitting, when at the first step abnormality is detected in transmitted data from any optical network unit, a transmission enabling duration reducing command to all of the optical network units; and
a third step of transmitting, when identification information of an optical network unit designated is received within a fixed phase tolerance for a transmission enabling phase designated to optical network units and when identification information of another optical network unit is also received up to a transmission enabling phase subsequently designated after the transmission of the transmission enabling duration reducing command at the second step, a transmission stop command to the other optical network unit and a command for restoring the transmission enabling duration for all of the optical network units.

2. A point-multipoint optical transmission method comprising:
a first step of determining whether or not identification information of an optical network unit designated is received within a fixed phase tolerance for a transmission enabling phase designated to optical network units on multipoint sides;
a second step of transmitting, when abnormality is detected in transmitted data from the optical network unit designated up to a transmission enabling phase subsequently designated after it is determined at the first step that the identification information of the optical network unit designated is received, a transmission enabling duration reducing command to the optical network unit designated; and
a third step of transmitting, when the identification information of the optical network unit designated is received and when identification information of another optical network unit is also received up to a transmission enabling phase subsequently designated after the transmission of the transmission enabling duration reducing command at the second step, a transmission stop command to the other optical network unit and a command for restoring the transmission enabling duration for the optical network unit designated.

3. A point-multipoint optical transmission device, comprising:
first means detecting abnormality in transmitted data from optical network units within a transmission enabling duration designated for a transmission enabling phase designated to the optical network units on multipoint sides;

second means transmitting, when by the first means abnormality is detected in transmitted data from any optical network unit, a transmission enabling duration reducing command to all of the optical network units; and third means transmitting, when identification information of an optical network unit designated is received within a fixed phase tolerance for a transmission enabling phase designated to optical network units and when identification information of another optical network unit is also received up to a transmission enabling phase subsequently designated after the transmission of the transmission enabling duration reducing command by the second means, a transmission stop command to the other optical network unit and a command for restoring the transmission enabling duration for all of the optical network units.

4. A point-multipoint optical transmission device, comprising:

first means determining whether or not identification information of an optical network unit designated is received within a fixed phase tolerance for a transmission enabling phase designated to optical network units on multipoint sides;

second means transmitting, when abnormality is detected in transmitted data from the optical network unit designated up to a transmission enabling phase subsequently designated after it is determined by the first means that the identification information of the optical network unit designated is received, a transmission enabling duration reducing command to the optical network unit designated; and third means transmitting, when the identification information of the optical network unit designated is received and when identification information of another optical network unit is also received up to a transmission enabling phase subsequently designated after the transmission of the transmission enabling duration reducing command by the second means, a transmission stop command to the other optical network unit and a command for restoring the transmission enabling duration for the optical network unit designated.

* * * * *